(12) United States Patent
Dortu

(10) Patent No.: US 7,467,254 B2
(45) Date of Patent: Dec. 16, 2008

(54) SEMICONDUCTOR MEMORY DEVICE WITH WRITE PROTECTED MEMORY BANKS

(75) Inventor: Jean-Marc Dortu, Munich (DE)

(73) Assignee: Infineon Technologies AG, Neubiberg (DE)

( * ) Notice: Subject to any disclaimer, the term of this patent is extended or adjusted under 35 U.S.C. 154(b) by 275 days.

(21) Appl. No.: 11/041,084

(22) Filed: Jan. 21, 2005

(65) Prior Publication Data
US 2005/0166008 A1 Jul. 28, 2005

(30) Foreign Application Priority Data
Jan. 22, 2004  (DE) ........................ 10 2004 003 323

(51) Int. Cl.
*G06F 13/00* (2006.01)
*G06F 12/00* (2006.01)

(52) U.S. Cl. ...................... 711/105; 711/100; 711/104; 711/154

(58) Field of Classification Search ................. 365/195; 711/100, 150, 151, 152, 154, 163, 104, 105
See application file for complete search history.

(56) References Cited

U.S. PATENT DOCUMENTS

| | | | | |
|---|---|---|---|---|
| 4,698,749 A * | 10/1987 | Bhadriraju | .................. | 711/104 |
| 4,780,820 A * | 10/1988 | Sowa | ............................. | 712/1 |
| 5,101,339 A * | 3/1992 | Fairman et al. | ................. | 711/2 |
| 5,305,460 A * | 4/1994 | Kaneko et al. | .............. | 711/163 |
| 5,325,449 A * | 6/1994 | Burt et al. | .................... | 382/240 |
| 5,901,103 A * | 5/1999 | Harris et al. | ................. | 365/226 |
| 6,044,032 A * | 3/2000 | Li | .......................... | 365/230.03 |
| 6,104,668 A * | 8/2000 | Lee et al. | .................... | 365/233 |
| 6,285,579 B1 * | 9/2001 | Riedlinger et al. | .......... | 365/154 |
| 6,504,785 B1 * | 1/2003 | Rao | ....................... | 365/230.05 |
| 6,654,303 B2 * | 11/2003 | Miyamoto et al. | .......... | 365/222 |
| 2003/0185032 A1* | 10/2003 | Zagorianakos et al. | ........ | 365/63 |
| 2003/0191912 A1* | 10/2003 | Dortu | ......................... | 711/154 |
| 2004/0177224 A1* | 9/2004 | Devaney et al. | ............. | 711/148 |
| 2005/0144372 A1* | 6/2005 | Walker | ....................... | 711/105 |

FOREIGN PATENT DOCUMENTS

DE    102 15 362 A1    10/2003

OTHER PUBLICATIONS

"Technology Behind 512 MB DDR SDRAM". Golden Emperor International. Jul. 2002. pp. 1-3. http://web.archive.org/web/20020723175616/http://www.geilusa.com/company.asp.*

* cited by examiner

*Primary Examiner*—Tuan V. Thai
(74) *Attorney, Agent, or Firm*—Dickstein Shapiro LLP

(57) ABSTRACT

The invention provides a semiconductor memory device that includes at least two memory banks. The semiconductor memory device is designed in such a way that: at least two processor units can carry out read accesses and write accesses to memory banks; and by means of an inhibit command communicated by one of the processor units, the write access by the processor unit which has communicated the inhibit command and/or by at least one of the other processor units to the inhibited memory bank is prevented at least occasionally. A circuit arrangement including the above semiconductor memory device is furthermore proposed.

13 Claims, 3 Drawing Sheets

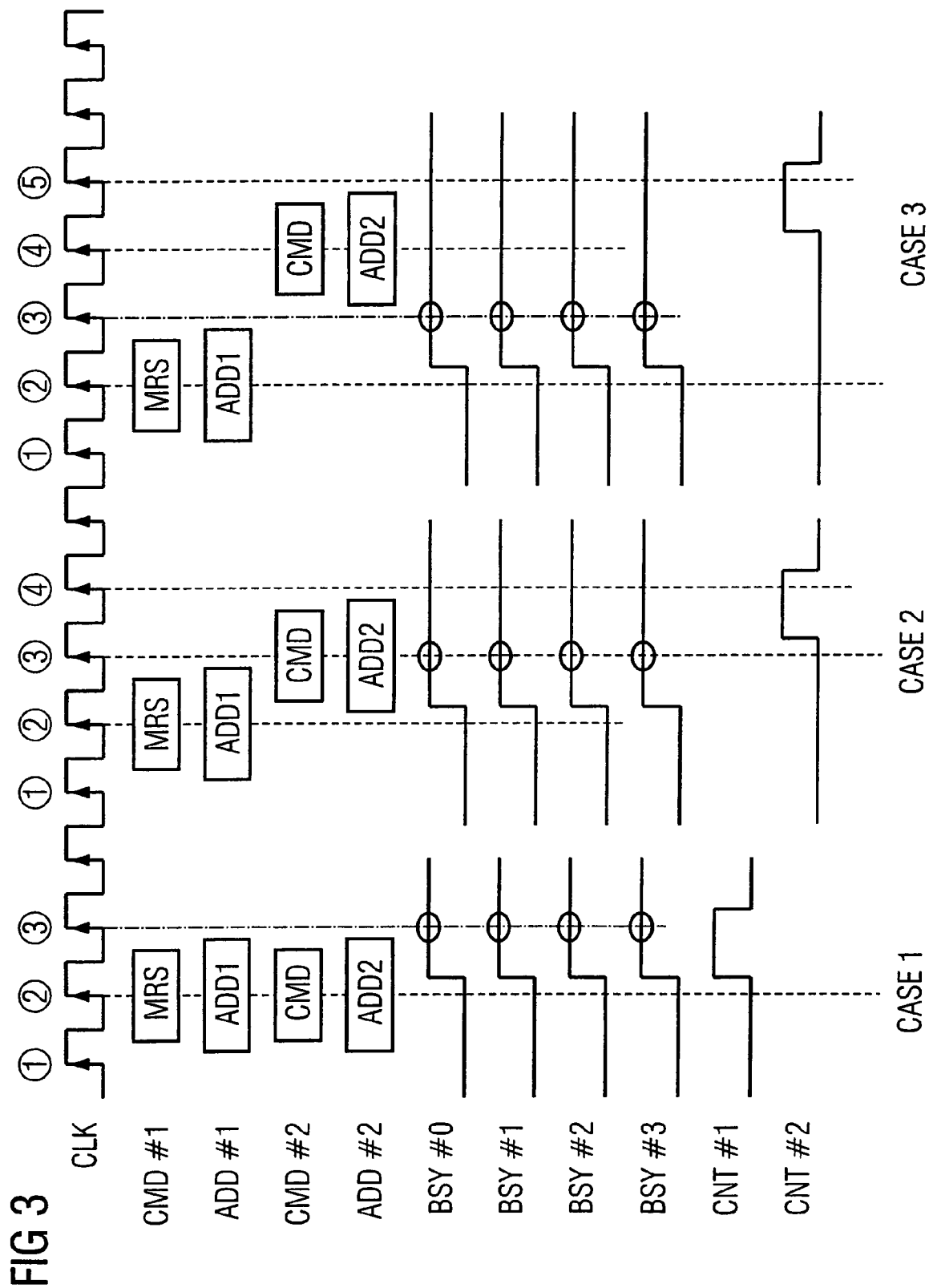

SEMICONDUCTOR MEMORY DEVICE WITH WRITE PROTECTED MEMORY BANKS

CROSS-REFERENCE TO RELATED APPLICATION

The present application claims priority to German patent application No. 10 2004 003323.4, filed Jan. 22, 2004, which is hereby incorporated by reference in its entirety.

TECHNICAL FIELD

The present invention relates to a semiconductor memory device and a circuit arrangement.

BACKGROUND

Circuit arrangements are known in which two or more processor units can access memory banks of a semiconductor memory device. If one of the processor units executes a program, it can happen, on account of a programming error, that program parts or system data are inadvertently overwritten or erased. This can lead to serious problems during operation of the circuit arrangement.

It is therefore desirable to provide a semiconductor memory device and a circuit arrangement which enable reliable operation.

SUMMARY

The present invention achieves the above object by providing a semiconductor memory device that includes at least two memory banks and is configured such that at least two processor units can carry out read accesses and write accesses to the memory banks. In addition, by means of an inhibit command communicated by one of the processor units, the write access by the processor unit which has communicated the inhibit command and/or by at least one of the other processor units to the inhibited memory bank is prevent at least occasionally.

Consequently, an undesirable and inadvertent overwriting of specific parts of the semiconductor memory device can be prevented with the aid of the inhibit command. The configuration command sequence is preferably transmitted to the semiconductor memory device at least at the beginning of operation. Furthermore, a configuration command sequence can be transmitted during operation once or repeatedly if, by way of example, an alteration of the programs stored in the semiconductor memory device has taken place or a new program has been stored in one of the memory banks. With the aid of the configuration command sequence, the configuration of the semiconductor memory device can be adapted in such a way that a write access by one or a plurality of processor units to specific memory banks is prevented or is not permitted.

Preferably, the inhibit command is part of a configuration command sequence for configuring the semiconductor memory device.

Preferably, at least a respective bit is provided for an inhibitable memory bank in the configuration command sequence.

Further preferably, one bit in each case is provided for an inhibitable memory bank in the configuration command sequence. Consequently, one or a plurality of memory banks can be inhibited or write-protected independently of one another with the aid of the configuration command sequence. It may furthermore be provided that as many bits as there are memory banks present in the semiconductor memory device are provided for the inhibit command in the configuration command sequence. Alternatively, it may be provided that only one predeterminable memory bank is protectable and, consequently, preferably only one bit is provided for the inhibit command in the configuration command sequence.

Preferably, the semiconductor memory device furthermore comprises a register circuit, which can be configured or programmed with the aid of the inhibit command in such a way that a write access by the processor unit which has communicated the inhibit command and/or by at least one of the other processor units to the inhibited memory bank is prevented at least occasionally.

Consequently, the register circuit is designed in such a way that it can be configured or programmed with the aid of the inhibit command in such a way that the write access by the processor unit which has communicated the inhibit command and/or by at least one of the other processor units to the inhibited memory bank is prevented at least occasionally. An undesirable overwriting of program parts can accordingly be prevented.

Preferably, at least one of the memory banks is formed as a program memory and at least another of the memory banks is formed as a data memory.

Consequently, preferably only specific memory banks are provided as memory space for downloaded applications or programs. Furthermore, it may be provided that only these memory banks provided for storing downloaded programs can be inhibited.

Preferably, the semiconductor memory device is an SDRAM.

The present invention furthermore is embodied in a circuit arrangement that includes the above described semiconductor memory device.

Preferably, at least one of the processor units is designed in such a way that it can communicate an inhibit command to at least one of the memory banks, by means of which inhibit command the write access by at least one of the preferably other processor units to said memory bank is prevented at least occasionally or temporarily.

Preferably, the read accesses and/or write accesses by the individual processor units are effected in each case independently of one another.

In particular, a so-called master-slave configuration may preferably be formed, in the case of which only one of the two processor units can communicate the inhibit command to the semiconductor memory device. By way of example, an undesirable and inadvertent write access by the second processor unit to protected program parts can thereby be prevented.

In a preferred embodiment, at least one of the processor units is formed as a communication processor unit and at least another of the processor units is formed as an application processor unit.

The circuit arrangement is preferably used for a mobile telephone. By way of example, programs and/or data can be downloaded to the mobile telephone with the aid of the communication processor unit. The downloaded programs can then be executed with the aid of the application processor unit. Preferably, that memory bank in which programs and/or system data are stored is inhibited. This makes it possible to prevent the situation in which, during execution e.g. of a downloaded program containing a programming error, specific regions of the semiconductor memory device are overwritten undesirably by the application processor unit.

Preferably, the communication processor unit is in the form of a processor unit which can transmit an inhibit command.

Consequently, by way of example, after the downloading of a program or of data, the communication processor unit can inhibit specific memory banks against a write access before, if appropriate, the downloaded programs are executed. Alternatively, it may furthermore be provided that the application processor unit can also communicate an inhibit command.

Further features, advantages and objects of the present invention will become apparent from the detailed description below of a preferred embodiment of the present invention with reference to the drawings.

BRIEF DESCRIPTION OF THE DRAWING FIGURES

The foregoing and other features of the present invention will be more readily apparent from the following detailed description and drawings of illustrative embodiments in which:

FIG. 3 shows an exemplary signal diagram showing a plurality of possible cases during operation of the circuit arrangement shown in FIGS. 1 and 2.

DETAILED DESCRIPTION OF PREFERRED EMBODIMENTS

Figure 1:
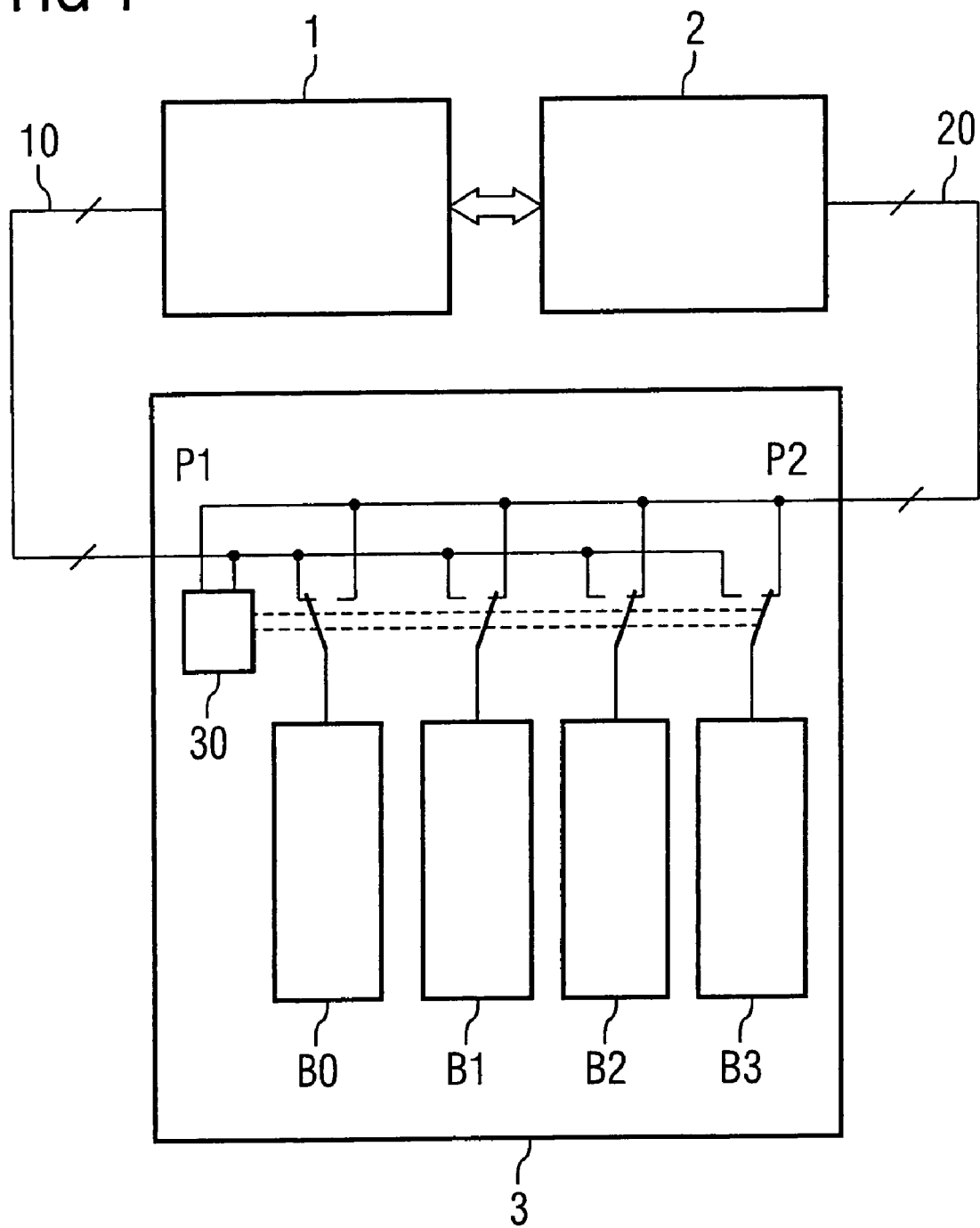
FIG. 1 shows a schematic view of a circuit arrangement in accordance with a preferred embodiment of the present invention.

FIG. 1 illustrates a circuit arrangement having a semiconductor memory device or a memory 3, which has a plurality of memory banks B0 to B3 with respective memory cells. The semiconductor memory device 3 additionally has two ports P1 and P2 that can be operated independently of one another and are connected to a respective communication bus 10 and 20 for external communication of the memory 3. Each of the communication buses 10 and 20 can be connected to each of the memory banks B0 to B3, illustrated symbolically by the respective switch symbols, which can be driven by a control circuit 30.

The circuit arrangement shown furthermore comprises two processor units 1, 2. However, it is also possible for more than two processor units to be provided.

The circuit arrangement illustrated may be used in a mobile telephone by way of example.

The processor unit 1 is preferably a communication processor, with the aid of which, by way of example, programs can be downloaded to the mobile telephone and can be stored in specific memory banks B0 to B3.

The processor unit 2 is preferably an application processor, which can execute programs, such as e.g. the programs downloaded by the processor unit 1.

Figure 2:
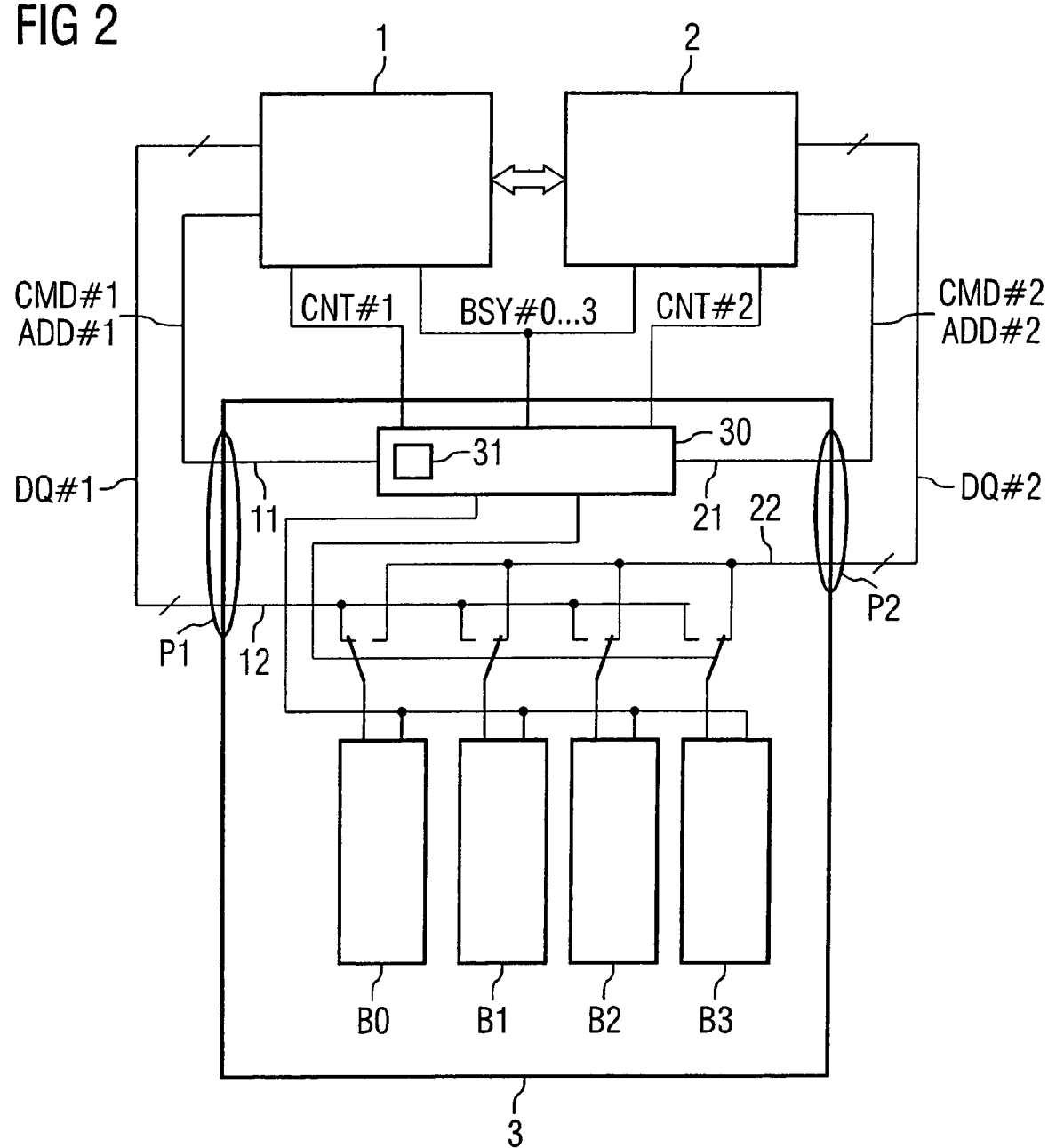
FIG. 2 shows a more detailed view of the circuit arrangement shown in FIG. 1.

FIG. 2 shows a more detailed view of the circuit arrangement of FIG. 1. Each of the ports P1 and P2 that can be operated independently of one another is connected to a respective command and address bus 11, 21 and a respective data bus 12, 22. The command and address bus 11 serves for transmitting command signals CMD#1 and address signals ADD#1 and is connected to the port P1. The data bus 12 serves for transmitting data signals DQ#1 and is likewise connected to the port P1. The command and address bus 21 serves for transmitting the command signals CMD#2 and address signals ADD#2 and is connected to the port P2. The data bus 22 serves for transmitting the data signals DQ#2 and is likewise connected to the port P2. The command and address bus 11 and data bus 12 are connected to the processor unit 1, and the command and address bus 21 and data bus 22 are connected to the processor unit 2. The respective data bus 12, 22 can be connected to each of the memory banks B0 to B3, likewise illustrated symbolically by switch symbols in FIG. 2.

The memory 3 has a control circuit 30, which controls the changeover of the data buses 12, 22 for connection to the respective memory banks B0 to B3 and additionally controls the access to the memory cells of the respective memory banks B0 to B3. The control circuit 30 is connected to the respective command and address bus 11, 21. The control circuit 30 furthermore generates a number of first control signals BSY#0 to BSY#3 corresponding to the number of memory banks B0 to B3. The control signals BSY#0 to BSY#3 are in each case assigned to one of the memory banks and in each case indicate if an access to the assigned memory bank takes place. In particular, the control signals BSY#0 to BSY#3 in the present case are brought to a "high" state or assume the value "1" if an access by a processor unit 1, 2 to the assigned memory bank takes place. Consequently, a further access to said memory bank is prevented during this time.

Furthermore, the control circuit 30 generates a number of second control signals CNT#1, CNT#2 corresponding to the number of ports P1, P2. One of the control signals CNT#1, CNT#2 is generated if an access collision occurs between an access to one of the memory banks via one of the ports P1, P2 and an access to the same memory bank via the respective other of the ports P1, P2. The control signals BSY#0 to BSY#3 and CNT#1, CNT#2 are provided at external terminals of the memory 3 and tapped off by the processor units 1 and 2. The latter in each case receive the control signals and access the memory 3 independently of one another in a manner dependent on said control signals.

Furthermore, the semiconductor memory device 3 has a register circuit 31 which is embodied in particular as a so-called mode register set (MRS). The register circuit 31 can be programmed or configured with the aid of a mode register set command (MRS command) or a configuration command sequence.

A specific operating mode of the semiconductor memory device 10 can be defined with the aid of the MRS command. The definition of this mode comprises, in particular, the determination of the burst length, the burst type, the CAS latency and a type of operation.

Furthermore, with the aid of the MRS command, the register circuit 31 can be configured with an item of information regarding which of the ports P1, P2 is prioritized for an access in the case of an access collision. The externally programmable register circuit 31 can be programmed by one of the processor units 1, 2 (so-called master processor) with an item of information as to which of the processor units 1, 2 is prioritized for an access in the case of an access collision. The information stored in the register circuit 31 is forwarded to the control circuit 30.

In the embodiment illustrated, the processor unit 2 is formed as a master processor. However, it is likewise conceivable for processor unit 1 to be formed as a master processor.

Furthermore, in the embodiment illustrated, the MRS command can be used to stipulate that a write access by the processor unit 2 to one or a plurality of memory banks B0 to B3 is prevented. For this purpose, specific bits with the aid of which this information is coded are provided in the MRS command. Preferably, the number of bits provided for inhibiting individual memory banks B0 to B3 in the MRS command matches the number of memory banks B0 to B3 that are intended to be formed in inhibitable fashion. By way of example, if two memory banks B1 and B2 are intended to be formed in inhibitable fashion, two bits are provided therefor in the MRS command.

Table 1 below illustrates by way of example a plurality of possible configurations for protecting specific memory banks B0 to B3 against a write access. It is assumed that all the memory banks B0 to B3 are intended to be formed in inhibitable fashion. Consequently, four address bits $A_k$ to $A_{k+3}$ are provided in the MRS command for the write protection of the memory banks B0 to B3. Only the address bits of the MRS command which are provided for determining the write protection are illustrated in Table 1. The bits provided for the write protection of the memory banks may be arranged in a directly successive order in the MRS command, as illustrated. Alternatively, any arbitrary arrangement of the bits may be provided.

TABLE 1

| k | k + 1 | k + 2 | k + 3 | Address bits |
|---|-------|-------|-------|--------------|
| 0 | 0 | 0 | 0 | No bank write-protected |
| 0 | 0 | 0 | 1 | B0 write-protected |
| 1 | 0 | 0 | 1 | B0 and B3 write-protected |
| 1 | 1 | 1 | 1 | All banks write-protected |

In Table 1, a "0" means that a memory bank is not write-protected and a "1" means that a bank is write-protected. In the case of the above example, 16 possible configurations are possible, only four of which are illustrated by way of example in Table 1.

The MRS command is communicated from the processor unit 1 to the semiconductor memory device 3 at least once at the beginning of operation of the circuit arrangement, e.g. when the mobile telephone is switched on. Furthermore, an MRS command can be communicated again to the semiconductor memory device 3 if, by way of example, a program has been downloaded by the processor unit 1 and the memory content of one or a plurality of the memory banks B0 to B3 has thus changed. In such a case, preferably that memory bank whose memory content has been altered is write-protected.

If an MRS command has been communicated from one of the processor units 1, 2 to the semiconductor memory device 3, firstly a predetermined time period $t_{MRC}$ must elapse before the semiconductor memory device 3 can receive a further command. During said time period $t_{MRC}$, all control signals BSY#0 to BSY#3 are in this case set to "1". Consequently, no further access to the memory banks B0 to B3 can be effected during the time period $t_{MRC}$.

It may furthermore be provided that the address bits provided for the write protection are provided in a so-called "extended mode register".

It may be provided that system programs are stored in predetermined memory banks and application programs are stored in other predetermined memory banks. In the embodiment illustrated, by way of example, the memory bank B0 is provided for system programs and the memory bank B1 is provided for application programs. In a preferred embodiment, it may be provided that only the memory banks provided for storing application programs can be write-protected.

It may furthermore be provided that a memory bank which contains system programs (this is the memory bank B0 in the present example) is always write-protected in order to prevent an inadvertent undesired overwriting of such important information items during the execution of a downloaded application.

The functioning of the circuit arrangement illustrated is explained in more detail below on the basis of an example.

At the beginning of operation of the circuit arrangement an MRS command is communicated to the semiconductor memory device 3 in order to define the configuration of the semiconductor memory device 3.

At an arbitrary point in time during operation, an application program is downloaded with the aid of the processor unit 1 and stored in the memory bank B1. Afterward, the processor unit 1 sends an MRS command to the semiconductor memory device 3, in which command the address bits that relate to the write protection of the memory banks B0 to B3 are set in such a way that the memory bank B1 is write-protected. At a later point in time, the downloaded program is executed by the processor unit 2. If the downloaded program contains a programming error, and for example instructions to overwrite program parts of the programs stored in the bank B1, such a write access by the processor unit 2 to the memory bank B1 is prevented with the aid of the write protection by the MRS command. If a further alteration of the memory banks, in particular by means of the processor unit 1, occurs during operation, an MRS command can be communicated again to the semiconductor memory device 3 and the write protection of the memory banks B0 to B3 can be adapted correspondingly.

FIG. 3 illustrates an exemplary signal diagram showing a plurality of possible cases during operation of the circuit arrangement shown in FIGS. 1 and 2.

Three cases (CASE 1 to 3) of different accesses are shown on the basis of the signal diagram in accordance with FIG. 3.

In case 1 (CASE 1) an MRS command is transmitted via port P1, all control signals BSY#0 to BSY#3 being set to "1" and a selected memory bank is accessed via port P2. At the instant (1) each of the processor units 1, 2 checks the state of the control signal BSY#i assigned to the respective memory bank. Since none of these signals is set, the MRS command is transmitted via port P1 and an access command CMD is transmitted at the instant (2). At the instant (3) both processor units 1, 2 notice that the respective control signal BSY#1 is set. An access collision occurs in this case. In this case, it is necessary to decide which of the ports P1, P2 is prioritized for an access in the case of an access collision. In case 1 in accordance with FIG. 3 the access via port P2 has priority. The control signal CNT#1 is set. This means that the access via port P1 is ignored for an access by the memory. The access via port P1 is stopped by the processor unit 1 and ignored by the memory; the access via port P2 is continued.

In case 2 in accordance with FIG. 3 (CASE 2) the processor unit 2 checks the state of all the control signals BSY#0 to BSY#3 at the instant (2), one clock cycle before it transmits the access command CMD. Since an MRS command was transmitted via port P1 at the instant (2) an access collision occurs at the instant (3). In this case, the control signal CNT#2 is set at the instant (4). The started access (MRS) to port P1 is continued; the access (CMD) to port P2 is ignored by the memory ("first come, first served").

In case 3 (CASE 3) processor unit 2 checks the control signals BSY#0 to BSY#3 before an access command CMD is transmitted. In the present case, however, in a departure from the specification, an access command CMD is nevertheless transmitted. In this case, the control signal CNT#2 is set at the instant (5) and the access via port P2 is ignored by the memory, while the access via port P1 is continued.

The text above has described the use of a semiconductor memory device in accordance with a preferred embodiment of the invention in a communication system. Any other suitable use in other systems is furthermore conceivable.

The present invention accordingly makes it possible to provide a write protection for specific and/or all memory banks B0 to B3 with the aid of the MRS command.

The write protection can be cancelled during operation by again communicating a correspondingly configured MRS command. If necessary, the write protection can furthermore be altered during operation by communicating a suitably configured MRS command. Consequently, memory banks B0 to B3 can be temporarily write-protected.

A programming of the semiconductor memory device may thus be enabled with the aid of the MRS command.

While exemplary drawings and specific embodiments of the present invention have been described and illustrated, it is to be understood that the scope of the present invention is not to be limited to the particular embodiments discussed. Thus, the embodiments shall be regarded as illustrative rather than restrictive, and it should be understood that variations may be made in those embodiments by workers skilled in the art without departing from the scope of the present invention as set forth in the claims that follow, and equivalents thereof. In addition, the features of the different claims set forth below may be combined in various ways in further accordance with the present invention.

The invention claimed is:

1. A semiconductor memory device, comprising:
   at least two memory banks;
   wherein the semiconductor memory device is configured such that at least two processor units can carry out read accesses and write accesses to the memory banks and, by means of an inhibit command communicated by one of the processor units, the write access to the inhibited memory bank by at least one of the processor unit which has communicated the inhibit command and the other processor unit to the inhibited memory bank is prevented at least occasionally;
   a control circuit adapted to set, based on an inhibit command, which of the at least two processor units is prioritized, in case of an access collision, when the two processors attempt to access the same memory bank; and
   a register circuit, which can be configured with the aid of the inhibit command in such a way that the write access by the processor unit which has communicated the inhibit command and/or by at least one of the other processor units to the inhibited memory bank is prevented at least occasionally,
   wherein the register circuit is further configured with an item of information regarding which of the processor units is prioritized for an access in the case of an access collision.

2. The semiconductor memory device as claimed in claim 1, the inhibit command being part of a configuration command sequence for configuring the semiconductor memory device.

3. The semiconductor memory device as claimed in claim 2, at least a respective bit being provided for an inhibitable memory bank in the configuration command sequence.

4. The semiconductor memory device as claimed in claim 1, at least one of the memory banks being formed as a program memory and at least another of the memory banks being formed as a data memory.

5. The semiconductor memory device as claimed in claim 1, the semiconductor memory device being an SDRAM.

6. A circuit arrangement comprising:
   a semiconductor memory device including at least two memory banks;
   at least two processor units designed in such a way that they can carry out read accesses and/or write accesses to the memory banks;
   at least one of the processor units being configured in such a way that it can communicate an inhibit command to at least one of the memory banks, and by means of the communicated inhibit command, the write access by at least one of the processor units to the inhibited memory bank is prevented at least occasionally;
   a control circuit adapted to set, based on the inhibit command, which of the at least two processor units is prioritized, in case of an access collision, when the two processors attempt to access the same memory bank; and
   a register circuit, which can be configured with the aid of the inhibit command in such a way that the write access by the processor unit which has communicated the inhibit command and/or by at least one of the other processor units to the inhibited memory bank is prevented at least occasionally,
   wherein the register circuit is further configured with an item of information regarding which of the processor units is prioritized for an access in the case of an access collision.

7. A circuit arrangement comprising:
   a semiconductor memory device having at least two memory banks;
   at least two processor units that are adapted to carry out read accesses and write accesses to the at least two memory banks;
   a programmable control circuit in communication with the at least two memory banks and the at least two processor units, the control circuit being configured so that under prescribed circumstances the write access by one of the at least two processor units to one of the at least two memory banks is prevented at least occasionally; and
   a register circuit associated with the control circuit and configured to be programmed to select which of the at least two processor units is prioritized for an access in the case of an access collision where two processor units attempt to access the same memory bank; and
   the control circuit adapted to set, based on an inhibit command, which of the at least two processor units is prioritized, in case of an access collision, when the two processors attempt to access the same memory bank.

8. The circuit arrangement of claim 7, wherein the register circuit is programmed by one of the processor units with an item of information as to which of the processor units is prioritized.

9. The circuit arrangement of claim 7, wherein the register circuit is programmed with the aid of one of a mode register set command (MRS command) and a configuration command sequence.

10. The circuit arrangement of claim 9, wherein the semiconductor memory device is configured such that if the MRS command is communicated from one of the processor units to the semiconductor memory device, a predetermined time period ($t_{MRC}$) must elapse before the semiconductor memory device can receive a further command resulting in no further access to any of the memory banks during the time period ($t_{MRC}$).

11. The circuit arrangement of claim 9, wherein one of the prescribed circumstances of when write access is prevented to one of the memory banks is when an MRS command is sent to the semiconductor device to write protect at least one of the memory banks.

12. The circuit arrangement of claim 11, wherein the write protection of the memory bank can be canceled during operation by communicating a second MRS command.

13. The circuit arrangement of claim 7, wherein one of the prescribed circumstances of when write access is prevented to one of the memory banks is when an inhibit command signal is communicated by one of the processor units resulting in the write access by at least one of the processor unit which has communicated the inhibit command and the at least one of the other processor units to the inhibited memory bank being prevented at least occasionally.

\* \* \* \* \*

UNITED STATES PATENT AND TRADEMARK OFFICE
CERTIFICATE OF CORRECTION

| | | |
|---|---|---|
| PATENT NO. | : 7,467,254 B2 | Page 1 of 1 |
| APPLICATION NO. | : 11/041084 | |
| DATED | : December 16, 2008 | |
| INVENTOR(S) | : Jean-Marc Dortu | |

It is certified that error appears in the above-identified patent and that said Letters Patent is hereby corrected as shown below:

At Col. 6, line 35, delete "BSY#i" and insert -- BSY#1 --, therefor.

Signed and Sealed this

Fourteenth Day of July, 2009

JOHN DOLL
*Acting Director of the United States Patent and Trademark Office*